United States Patent
Berntorp et al.

(10) Patent No.: US 9,989,964 B2
(45) Date of Patent: Jun. 5, 2018

(54) SYSTEM AND METHOD FOR CONTROLLING VEHICLE USING NEURAL NETWORK

(71) Applicant: Mitsubishi Electric Research Laboratories, Inc., Cambridge, MA (US)

(72) Inventors: Karl Berntorp, Watertown, MA (US); Ming-Yu Liu, Sunnyvale, CA (US); Avishai Weiss, Jamaica Plain, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 35 days.

(21) Appl. No.: 15/342,216

(22) Filed: Nov. 3, 2016

(65) Prior Publication Data
US 2018/0120843 A1 May 3, 2018

(51) Int. Cl.
 G05D 1/00 (2006.01)
 G05D 1/02 (2006.01)
 G06N 3/04 (2006.01)
 G06N 3/08 (2006.01)
 G05B 13/02 (2006.01)

(52) U.S. Cl.
 CPC ......... G05D 1/0088 (2013.01); G05B 13/027 (2013.01); G05D 1/0221 (2013.01); G06N 3/049 (2013.01); G06N 3/08 (2013.01)

(58) Field of Classification Search
 CPC ...... G05D 1/0088; G05D 1/0221; G06N 3/04; G06N 3/08; G05B 13/027
 See application file for complete search history.

(56) References Cited

U.S. PATENT DOCUMENTS

| | | | | |
|---|---|---|---|---|
| 5,410,477 A | * | 4/1995 | Ishii | B60T 8/174 701/102 |
| 6,526,352 B1 | * | 2/2003 | Breed | G01C 21/3697 342/357.31 |
| 7,046,822 B1 | | 5/2006 | Knoeppel et al. | |
| 7,085,637 B2 | * | 8/2006 | Breed | B60N 2/2863 340/440 |
| 7,202,776 B2 | * | 4/2007 | Breed | B60N 2/2863 340/435 |
| 7,447,593 B2 | | 11/2008 | Estkowski et al. | |

(Continued)

FOREIGN PATENT DOCUMENTS

| WO | 2016124487 A1 | 8/2016 |
|---|---|---|
| WO | 2016130719 A2 | 8/2016 |

Primary Examiner — Russell Frejd
(74) Attorney, Agent, or Firm — Gene Vinokur; James McAleenan; Hironori Tsukamoto

(57) ABSTRACT

A method and a system generate a time-series signal indicative of a variation of the environment in vicinity of the vehicle with respect to a motion of the vehicle and submit the time-series signal to the neural network to produce a reference trajectory as a function of time that satisfies time and spatial constraints on a position of the vehicle. The neural network is trained in to transform time-series signals to reference trajectories of the vehicle. The motion trajectory tracking the reference trajectory while satisfying constraints on the motion of the vehicle is determined and the motion of the vehicle is controlled to follow the motion trajectory.

18 Claims, 16 Drawing Sheets

(56) References Cited

U.S. PATENT DOCUMENTS

| | | | |
|---|---|---|---|
| 7,672,920 B2 * | 3/2010 | Ito | G06K 9/00335 706/30 |
| 8,825,207 B2 | 9/2014 | Kim et al. | |
| 9,195,904 B1 | 11/2015 | Liu et al. | |
| 2008/0040004 A1 | 2/2008 | Breed et al. | |

* cited by examiner

| Specifications on motion of the vehicle |
|---|
| 500 Stay on the road |
| 510 Stay in the middle of the lane |
| 520 Maintain nominal longitudinal velocity |
| 530 Maintain safety margin to surrounding obstacles |
| 540 Maintain minimum distance to vehicles in the same lane |
| 550 Drive smoothly |

FIG. 5

SYSTEM AND METHOD FOR CONTROLLING VEHICLE USING NEURAL NETWORK

FIELD OF THE INVENTION

The present invention relates generally to controlling vehicles, and more particularly to controlling an autonomous or a semi-autonomous vehicle using neural network.

BACKGROUND OF THE INVENTION

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

One important source of information for understanding the surroundings of a vehicle is the information sensed by the on-vehicle perception sensors, such as a camera, a stereo camera, a LIDAR, an ultrasound sensor, and radar. The objects surrounding the vehicle can be detected and recognized directly from the measurements of the on-vehicle perception sensors, as described, e.g., in U.S. Pat. No. 9,195,904. The recognized objects can be used to determine a dynamic map of the environment of the vehicle. Such a dynamic map can be used for predicting the motion of the vehicle. However, the methods for detecting and/or recognizing the object and for building the dynamic map take time and computational resources.

Therefore, it is desirable to streamline the process for determining and controlling the motion of the vehicle.

SUMMARY OF THE INVENTION

It is an object of some embodiments to provide a system and a method for controlling motion of the vehicle using a neural network. Those embodiments are based on recognition that the neural network can be trained in advance, e.g., offline, and reused for online control of the motion of the vehicle.

It is another object of some embodiments to provide such a neural network that can reduce the necessity for object detection and recognition in vehicle motion control applications. For example, it is an object of one embodiment to provide a neural network that does not use the dynamic map to facilitate motion control of the vehicle.

Some embodiments are based on recognition that there is an infinite number of environments the vehicle can experience. To that end, it is impossible or at least impractical to use all possible environments to train the neural network. For example, consider the differences between driving in different countries; different cars have different colors, there are different regulations on lane widths, different number of lanes, and local driving regulations, such as speed limits, different lane markers, and rules for yielding, make up for an uncountable number of environments. However, independent on the environment, the experience from driving in one country, say Sweden, provides a solid basis for also being able to drive in, for example, the USA.

Some embodiments are based on recognition that although there is an infinite number of environments that can surround the driving vehicle leading to an abundance of information to be processed, only limited, i.e., finite or approaching finite, subset of the information from those environments are used in making a driving decision. For example, many parts of what a human's five senses experience about the world are redundant for making a driving decision. For example, it does not matter whether a car in front of the vehicle one is driving is black, yellow, or white: what matters is that it is a car having a velocity. Similarly, it does not matter whether the leaves in the trees on the side of the road are green or yellow. In fact, since the trees are located on the side of the road and not on the road, as long as a road departure can be avoided, the trees are irrelevant for making an informed decision on which path to take.

To that end, some embodiments are based on realization that only subset of the information sensed in the environments is relevant for making a driving decision. Moreover, in different environments, similar types of the information, such as the information indicative of the motions and velocities of the cars driving in proximity to the vehicle can be considered. Such information can be used to train the neural network, which can simplify design a training of the neural network and help to avoid using the dynamic map to facilitate motion control of the vehicle. For example, one embodiment treats the information relevant for making a driving decision as constraints on the motion of the vehicle.

In addition to the number of different environments, there can be also an infinite number of situations that can occur and to which the autonomous vehicle needs to react. However, despite all different types of situations that can occur, there are only a limited number of actions that are taken to handle the particular situation. As an example, consider driving on a two-lane road when a car suddenly slows down in front of your vehicle. Regardless of the manner with which the driver in front brakes, there are a limited number of different actions to avoid a crash, e.g., either slow down even faster than the car in front or change the lane, if possible.

To that end, some embodiments are based on realization that the neural network can be designed to transform time-series signals indicative of the environment to reference trajectories of the vehicle specifying an objective of the motion of the vehicle. For example, in one embodiment, the neural network includes encoding and decoding subnetworks that are trained concurrently. The encoding subnetwork is trained to transform the time-series signal to information indicative of the constraints on the motion of the vehicle, which is an analogy to selecting the information relevant for making the driving decision. The decoding subnetwork is trained to produce the reference trajectory from the information indicative of the constraints on the motion of the vehicle. The subnetwork is trained for making a decision about which action to take or objective to have in a specific situation at a given time. In such a manner, the finality of a number potential reference trajectories and the information needed for determining the reference trajectories are taken by the neural network into a consideration.

However, even if there are a limited number of actions or objectives the autonomous vehicle can undertake at any given instance of time, there are an infinite number of control commands that can be selected to reach a desired objective. For example, when deciding to change a lane, the steering command can be chosen among a continuous set of different steering torques. Furthermore, the throttle and brake commands can all be chosen among a continuous set between full acceleration and full deceleration, and to learn exactly what command to output in a particular time instant in a particular scenario and in a particular environment, can demand infinite computational resources. Some embodiments are based on recognition that despite the possibility to choose among a great number of combinations of the control actions, the desired future trajectory, or future path, that the vehicle should follow can stay the same irrespective of the exact value of the control actions.

To that end, some embodiments are based on recognition that after the reference trajectory is determined, the motion trajectory, e.g., specifying the control commands, can be later determined as a post processing step. In such a manner, the abundance of different combinations of the control actions to follow the reference trajectory is handled outside of the neural network. Also, the neural network is decoupled from the specific dynamics of different types of the vehicle and the same neural network can be reused by different types and models of the vehicles.

Accordingly, one embodiment discloses a method for controlling a vehicle. The method includes generating, using at least one sensor, a time-series signal indicative of a variation of the environment in vicinity of the vehicle with respect to a motion of the vehicle; selecting from a memory a neural network trained to transform time-series signals to reference trajectories of the vehicle; submitting the time-series signal to the neural network to produce a reference trajectory as a function of time that satisfies time and spatial constraints on a position of the vehicle; determining a motion trajectory tracking the reference trajectory while satisfying constraints on the motion of the vehicle; and controlling the motion of the vehicle to follow the motion trajectory. At least some steps of the method are performed by a processor operatively connected to the memory and the sensor.

Another embodiment discloses a system for controlling a vehicle. The system includes at least one sensor for sensing the environment in vicinity of the vehicle to generate a time-series signal indicative of a variation of the environment with respect to a motion of the vehicle; a memory storing a neural network trained to transform time-series signals to reference trajectories of the vehicle; at least one processor configured for submitting the time-series signal to the neural network selected from the memory to produce a reference trajectory as a function of time that satisfies time and spatial constraints on a position of the vehicle and for determining a motion trajectory tracking the reference trajectory while satisfying constraints on the motion of the vehicle; and a controller for controlling the motion of the vehicle to follow the motion trajectory.

Yet another embodiment discloses a non-transitory computer readable storage medium embodied thereon a program executable by a processor for performing a method. The method includes generating a time-series signal indicative of a variation of the environment in vicinity of the vehicle with respect to a motion of the vehicle; selecting a neural network trained to transform time-series signals to reference trajectories of the vehicle; submitting the time-series signal to the neural network to produce a reference trajectory as a function of time that satisfies time and spatial constraints on a position of the vehicle; determining a motion trajectory tracking the reference trajectory while satisfying constraints on the motion of the vehicle; and controlling the motion of the vehicle to follow the motion trajectory.

BRIEF DESCRIPTION OF THE DRAWINGS

FIG. 5 is an exemplar specification on the motion of the vehicle, which are taken into consideration when training the neural network;

DETAILED DESCRIPTION OF THE PREFERRED EMBODIMENTS

It is an object of some embodiments to provide a system and a method for controlling motion of the vehicle using a neural network. Those embodiments are based on recognition that the neural network can be trained in advance, e.g., offline, and reused for online control of the motion of the vehicle.

It is another object of some embodiments to provide such a neural network that can reduce the necessity for object detection and recognition in vehicle motion control applications. For example, it is an object of one embodiment to provide a neural network that does not use the dynamic map to facilitate motion control of the vehicle.

As used herein, a vehicle can be any vehicle that is capable of sensing its environment and navigating without human input. Examples of such a vehicle include autonomous and semi-autonomous cars. For example, some embodiments are based on realization that the future reference trajectory to follow by a vehicle can be determined directly through sensor data, rather than first determining a dynamic map from the sensor data, then use this map in a path-planning component. As used herein, the reference trajectory can be a path with time information, hence implicitly or explicitly including velocity information, but the reference trajectory can also refer to a path without time information. Some embodiments are based on recognition that although there are an infinite number of scenarios and environments a driver encounters over the course of a lifetime, the number of resulting actions and subsequent paths a driver undertakes to react to the scenarios is finite.

Figure 1A:
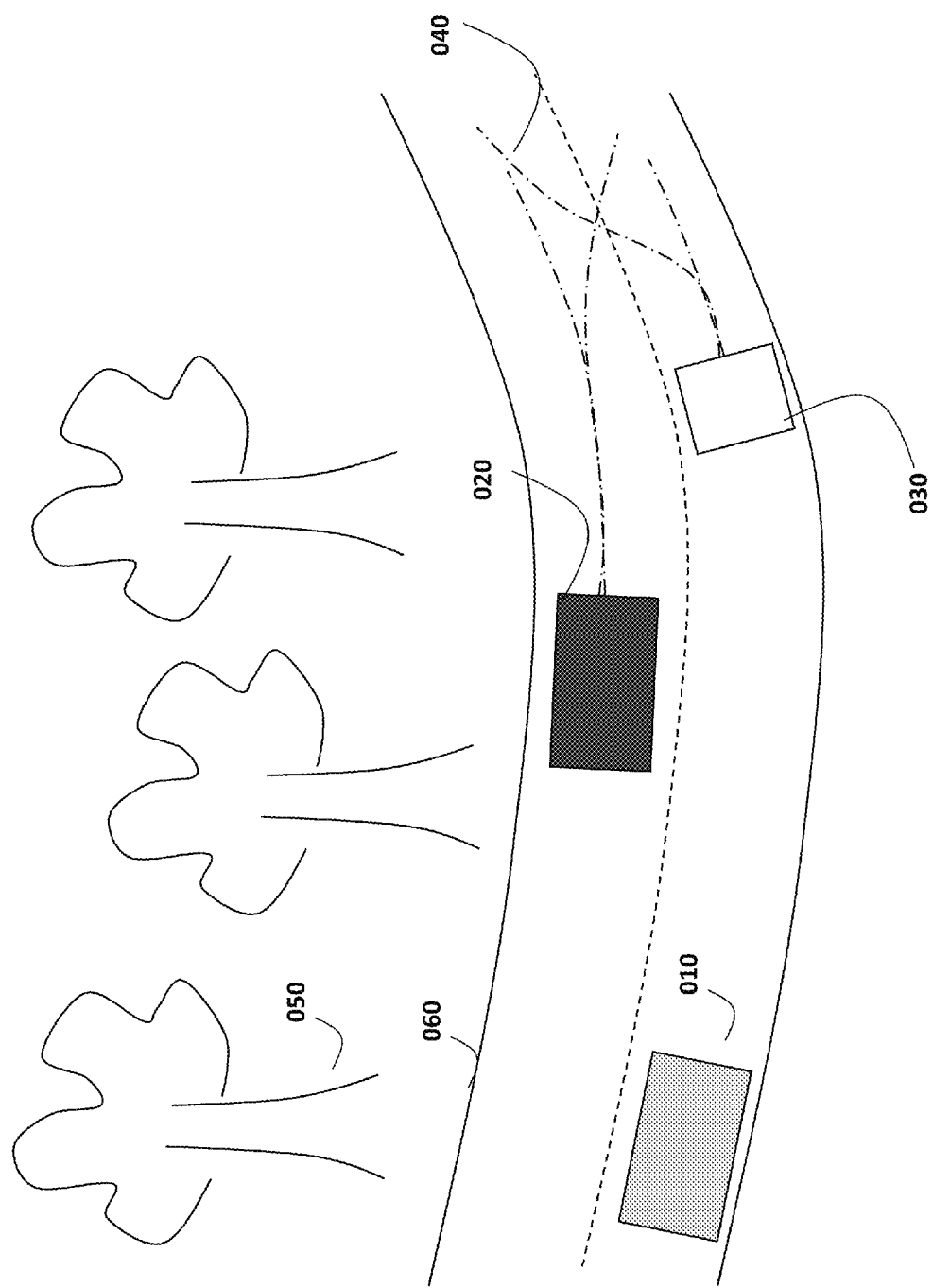
FIG. 1A and FIG. 1B are exemplar setups for driving a vehicle.
Figure 1B:
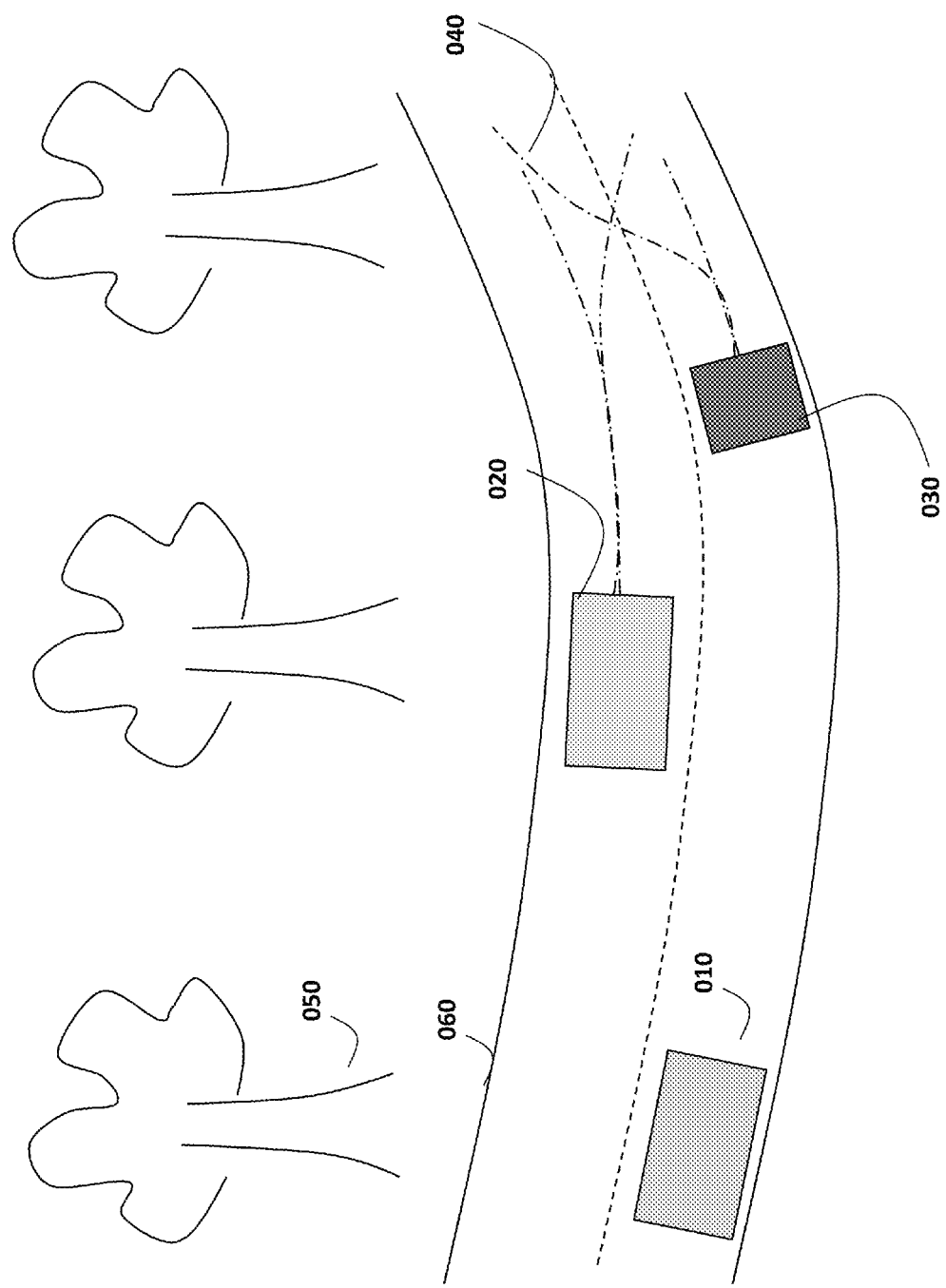

FIG. 1A and FIG. 1B show exemplar setups, in which an autonomous vehicle 010 drives in the right lane of a two-lane road with road boundaries 060. Present on the road is vehicle 020 and vehicle 030. The human's five senses together give a complete description of the environment. Every scenario gives slightly different combinations of sensor outputs, compare FIG. 1A with 1B, where slightly different positioning of the trees 050 and the different coloring of the other vehicles 020 and 030, gives a slightly different environment. Hence, when extrapolating this, to learn how to react to all different combinations individually, for each tiny variation in the surroundings, is overwhelming. However, there are similar elements in the different environments that are relevant to navigating a vehicle, and the human brain learns which parts of the sensor outputs that are relevant to drive a vehicle under various conditions, situations, and environments.

For instance, when comparing FIG. 1A with FIG. 1B, it is clear that the tree positions 050 are irrelevant, because the trees are outside of the road boundaries 060, which must not be exceeded. Furthermore, what is important for the autonomous vehicle when determining a suitable motion is not the different colorings of the vehicles 020 and 030. However, what is imperative is what future paths 040 the other vehicles take, since the path to be driven by the autonomous vehicle relies on this. That is, in FIGS. 1A and 1B, what matters when deciding what a future path of the vehicle should be, is the motion of other vehicles on the road.

When changing lane, the steering command can be chosen among a continuous set of different steering torques. Furthermore, the throttle and brake commands can all be chosen among a continuous set between full acceleration and full deceleration, and to learn exactly what command to output in a particular time instant in a particular scenario and in a particular environment, would demand infinite computational resources. However, the desired path that the vehicle should follow in a given situation is similar for different drivers, although the driving style gives different control commands to achieve the intended path.

One source of information for understanding the surroundings is raw input data from on-vehicle perception sensors, such as a camera, a stereo camera, a LIDAR, an ultrasound sensor, and radar. Using the input data, objects can be recognized and detected. Subsequently, information about objects can be sent to a path planner, which utilizes this information when predicting a future, safe path for the vehicle. However, this approach has the drawback that a lot of computation is spent on detecting objects and providing information that are redundant or not relevant for the path planner.

Accordingly, some embodiments are based on realization that a future, smooth path of the vehicle that avoids obstacles, can be achieved by mapping a sequence of input data, such as a sequence of images, into a predicted path of the vehicle, where a vehicle can be any type of moving transportation system, including a passenger car, a mobile robot, or a rover. For example, in a case where a passenger car travels on a road with a slow preceding vehicle, by analyzing a sequence of image frames from at least one camera, which is mounted on the vehicle, some embodiments of the invention determine a vehicle path that avoids objects determined from the image to reside in the scene, where a path avoiding an obstacle includes changing lane of a vehicle, or maintaining the same lane but slowing down to the velocity of the preceding vehicle. The input data can include derivatives of image frames, LIDAR data, global positioning information (GPS), or sensor data from other sensors, such as inertial sensors, or as combinations of the said input data.

Figure 1C:
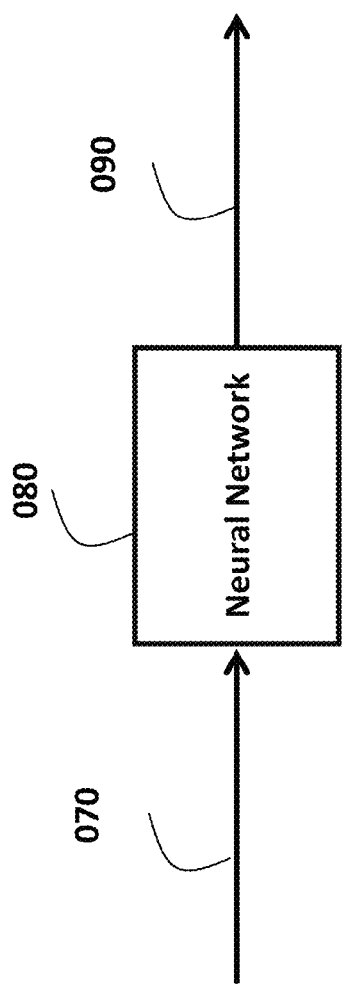
FIG. 1C is a schematic of one embodiment for a neural network that reduces computations in vehicle motion control.

FIG. 1C shows a schematic of one embodiment for a neural network that reduces computations in vehicle motion control. The neural network 080 is trained to receive a time-series signal 070 of predetermined size that is indicative of variations of the environment in the vicinity of the vehicle and transforms the time-series signal 070 to a reference trajectory 090 of the vehicle, that is, a trajectory that the vehicle, without sensing and modeling disturbances, ideally should follow. With this definition of the neural network, the smoothness of the motion of the vehicle can be guaranteed since there is prediction of trajectories encoded into the neural network.

Figure 1D:
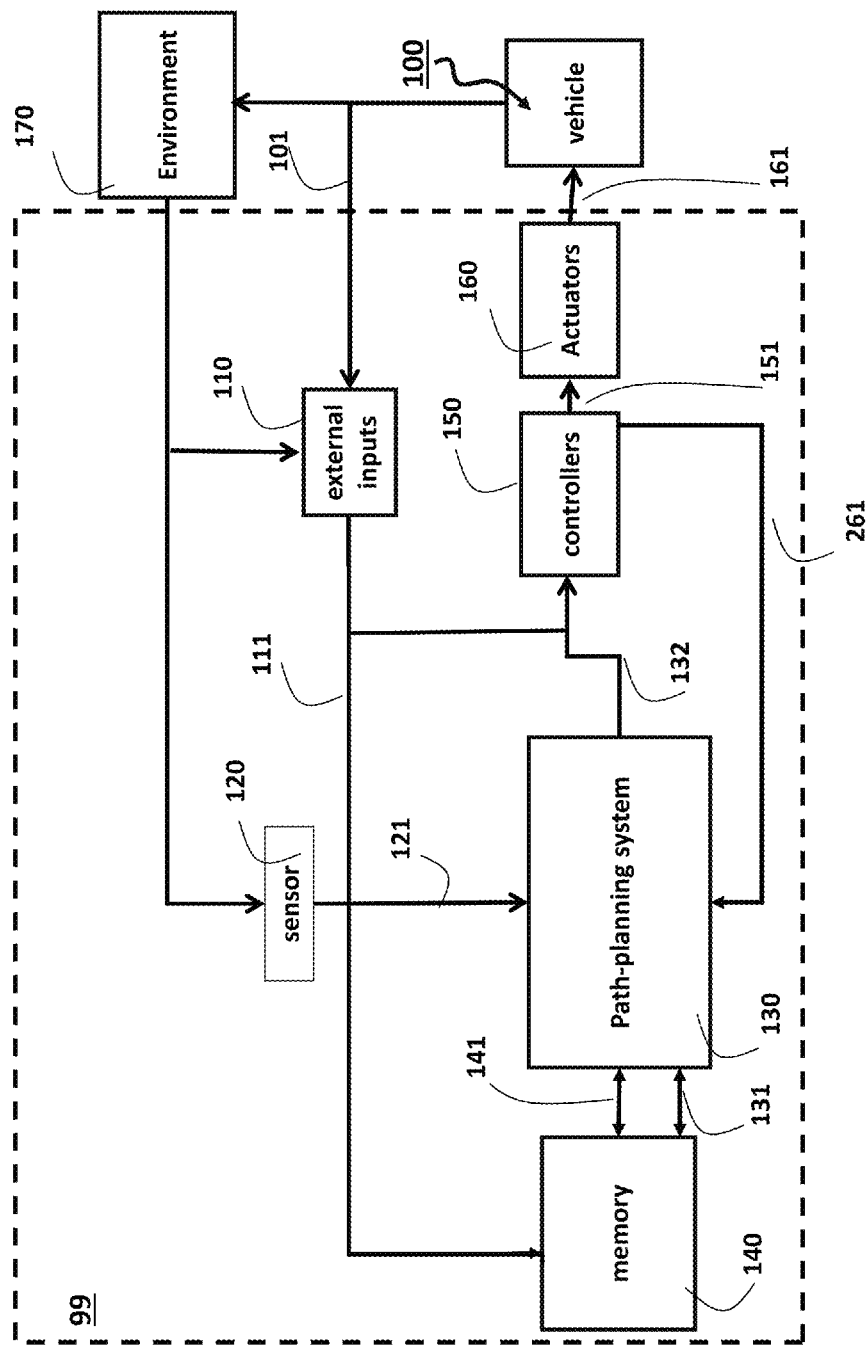
FIG. 1D is a block diagram of a system for controlling a vehicle according to some embodiments.

FIG. 1D shows a block diagram of a system 99 for controlling a vehicle according to some embodiments of the invention. The vehicle can be any type of system intended to be executed autonomously or semi-autonomously. The system can include a human operator 110, and in such a case the system is semi-autonomous and includes possibilities of overriding and allowing, respectively, the action of the driver 110. As one example, the system 100 can be a four-wheel passenger car. Another example of a possible system is a differential-drive mobile robot. A third example is an industrial robot manipulator. In the detailed description, an automotive vehicle will be used throughout to illustrate the invention.

The vehicle 100 includes at least one sensor 120 that senses the environment in vicinity of the vehicle. The sensor could be of several types. For example, the sensor can be a video camera that gives sequence of camera images of the environment, or it can be a LIDAR, which gives three-dimensional points of the environment captured by the LIDAR scanner. The sensor setup can also be a combination of different sensors. For example, the video camera can be combined with a global positioning system (GPS) that gives information of position of the camera and/or origin of the sequence of images acquired by the camera.

Additionally, or alternatively, the camera and GPS can be combined with an accelerometer, which combined with the two sensors can give velocity and acceleration information associated with the image sequence. One sensor can be an inertial measurement unit (IMU). For example, the IMU can include 3-axis accelerometer(s), 3-axis gyroscope(s), and/or magnetometer(s). The IMU can provide velocity, orientation, and/or other position related information. Over the course of time, the sensor provides a sensor signal 121 to a path-planning system 130.

The system 99 also includes a memory 140 storing at least one neural network. The neural network stored in the memory 140 is trained to map time-series signals 131 to future predicted trajectories of the vehicle. Additionally, or alternatively, in one embodiment, the memory 140 stores a set of neural networks, each neural network in the set is trained to consider different driving styles for mapping the time-series signals to reference trajectories of the vehicle.

For example, the system 99 can determine a driving style for controlling the vehicle and select 141 from the memory the neural network corresponding to the determined driving style. For example, the driving style can be determined based on an input from a user of the vehicle. Additionally, or alternatively, when the vehicle is a semi-autonomous vehicle, the driving style of a driver of the vehicle can be learned while the vehicle is driven in a manual mode. Additionally, or alternatively, the system 99 can select the neural network based on the time-series signals 131 itself. For example, for different driving situations, for example, given by an external input 110, different neural networks are selected 141.

The path-planning system 130 takes a sequence of sensor signals 121 and produces a time-series signal 131. The memory 140 provides a neural network 141 to the path-planning system 130, which determines a reference trajectory 132. In addition, a desired waypoint, i.e., an intermediate desired position, can also be given to the neural network, in addition to the sensor inputs. The waypoint has the purpose of guide the chosen trajectory to a desired path. In another embodiment, the waypoints are also given for the purpose of training the network. In various embodiments, the reference trajectory 132 can be represented as one or combination of a sequence of Cartesian coordinates with a time associated to each coordinate, a sequence of positions and velocities of the vehicle, and a sequence of headings of the vehicle.

The system 99 can also include a set of controllers 150 for determining a set of control references 151 for tracking the reference trajectory 132. The set of control references are sent to the actuators 160 of the vehicle for execution. For example, in case of unforeseen and/or unmodeled effects, for example due to uncertainties in the environment 170 or the sensors 120, or finite precision in the neural network 141, the motion trajectory 101 of the vehicle can be slightly different from the reference trajectory 132. However, the controllers 150 ensure that the motion trajectory 101 is close, with bounded error, to the reference trajectory 132. For example, the controllers 150 can include a failure-mode controller, which acts as a security layer for when either the trajectory 132 or the other controllers in 150 fail.

Figure 1E:
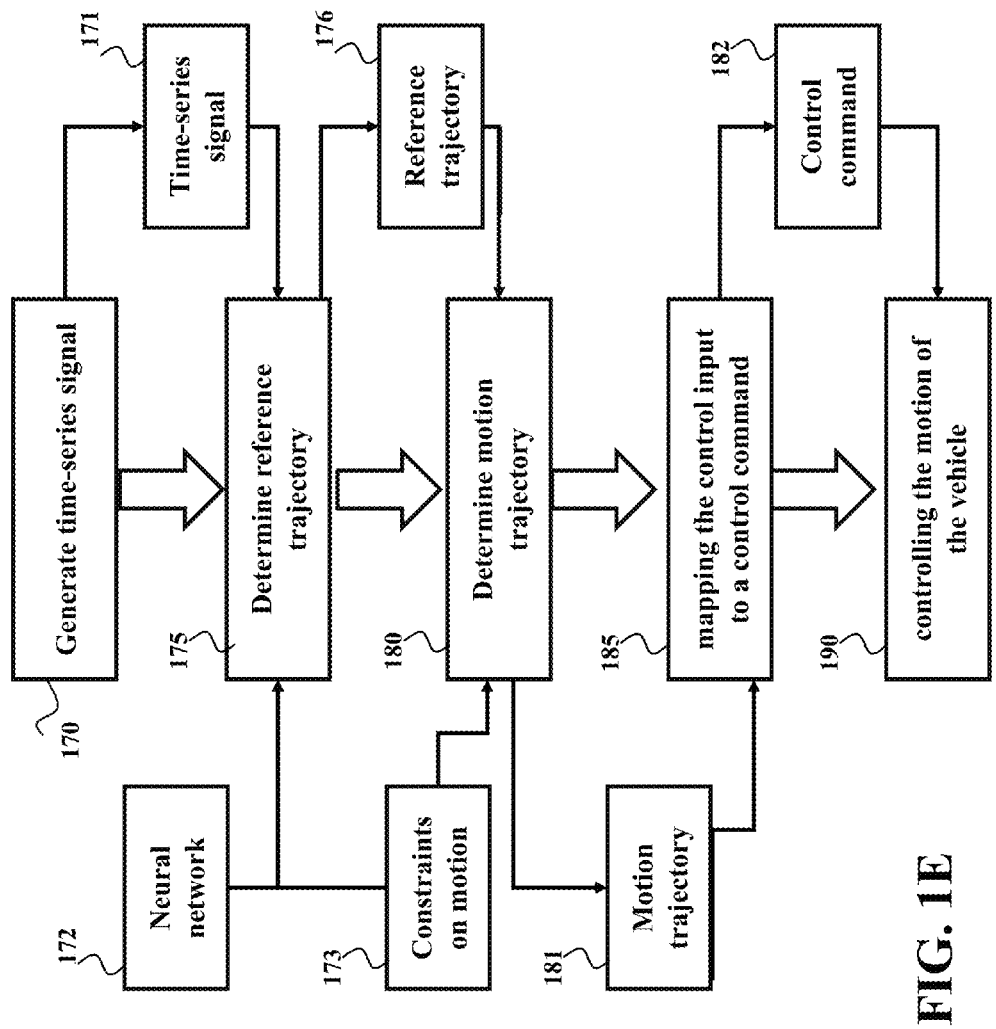
FIG. 1E is a flowchart of a method for controlling a motion of a vehicle according to some embodiments.

FIG. 1E shows a flowchart of a method for controlling a motion of a vehicle according to some embodiments of the invention. The method generates 170a time-series signal 171 indicative of a variation of the environment in vicinity of the vehicle with respect to a motion of the vehicle. A sequence of measurements of at least one sensor is used 170 to produce a time-series signal 171. The time-series signal 171 can be generated from measurements of various sensors of the vehicle and can include information about objects and environment surrounding the vehicle. The time-series signal can be also refines using position and velocity of the vehicle.

The method selects 175, e.g., from the memory 140, a neural network 172 trained to transform time-series signals to reference trajectories of the vehicle and determines 175 the reference trajectory 176 submitting the time-series signal to the neural network. The neural network is trained to produce the reference trajectory 176 as a function of time that satisfies time and spatial constraints on a position of the vehicle. As referred herein, time and spatial constraints on a position of the vehicle are requirements on the position of the vehicle at specific future time instants that the vehicle should fulfill, in order to guarantee that the vehicle does not collide with other obstacles, such as other vehicles or pedestrians, to make sure that the vehicle does not drive out of the road, and to provide robustness to imperfections in the sensing and in the training of the neural network. Examples of the time and spatial constraints include a bound on a deviation of a location of the vehicle from a middle of a road, a bound of deviations from a desired location at a given time step, a bound on a deviation of the time when reaching a desired location, a minimal distance to an obstacle on the road, and the time it should take to complete a lane change.

The method determines 180 a motion trajectory 181 tracking the reference trajectory 176 while satisfying constraints on the motion of the vehicle 173. As referred herein, the constraints on the motion of the vehicle are requirements that the motion of the vehicle should fulfill in order to provide a safe and smooth ride of the users of the vehicle and the environment. While the spatial constraints on the vehicle make sure that the vehicle behaves as desired at certain combinations of time and place, the constraints on the motion of the vehicle concerns the motion used to reach the different positions of the vehicle. Examples of the constraints on the motion of the vehicle include a bound on a change from a current acceleration and a heading angle and heading rate of the vehicle, a bound on a deviation from a desired velocity profile of the vehicle, a bound on the lateral velocity of the vehicle, a bound on the velocity deviations from surrounding vehicles, and the velocity and heading profile when completing a lane change or when passing another vehicle.

The motion trajectory can be determined in several ways, but the general principle is to map the reference trajectory to a motion trajectory, where the motion trajectory can be, but does not have to be, a lower-level representation of the reference trajectory. For example, the reference trajectory can include a position profile of the vehicle, but the controllers that are responsible for the actuation of the vehicle cannot take a position profile as an input, but rather other entities such as wheel slip, speed profile, steering angle of the wheels, or some other representation. The determining the motion trajectory also fills the purpose of removing, or at least suppressing, the impact of remaining uncertainties that are not captured by the neural network 172. For example, the neural network does not explicitly learn the dynamics of the vehicle, since that is computationally prohibitive for a neural network. However, for someone skilled in automatic control the dynamics of the vehicle can be taken into account by techniques from the control community.

In some embodiments, the motion trajectory is determined using a model predictive controller that maps the reference trajectory to a motion of the steering trajectory of the wheels of the vehicle and to a motion of the velocity trajectory of the wheels of the vehicle while considering the measurements on the motion of the vehicle, that is, the controller can be a feedback controller. In another embodiment, the aforementioned model predictive controller instead maps the reference trajectory to a desired wheel slip trajectory of the vehicle and a desired steering trajectory of the wheels of the vehicle. It is to be acknowledged that any technique, such as look up tables, Lyapunov control, learning-based control, that maps the reference trajectory to a motion trajectory of the vehicle can be used for the purpose, but model predictive control has been used as an example because it can explicitly account for constraints on the motion of the vehicle, ensuring that the same constraints are considered both by the neural network that gives the reference trajectory and when determining the motion trajectory. It is also to be acknowledged that the motion trajectory can be split up into two parts; one feedback part that was explained above and one feedforward part, which determines the motion trajectory that would occur without any external disturbances.

The method controls the motion of the vehicle to follow the motion trajectory. For example, the method maps 185 the motion trajectory 181 to a control command 182, and control 190 the motion of the vehicle according to the control command. The steps of the method are performed by a processor of the vehicle, operatively connected to the memory 140 and at least one sensor 120. Furthermore, the determining 180 can be viewed as determining a motion trajectory 181 that includes a set of commands for actuators of the vehicle to move the vehicle according the objective.

Figure 1F:
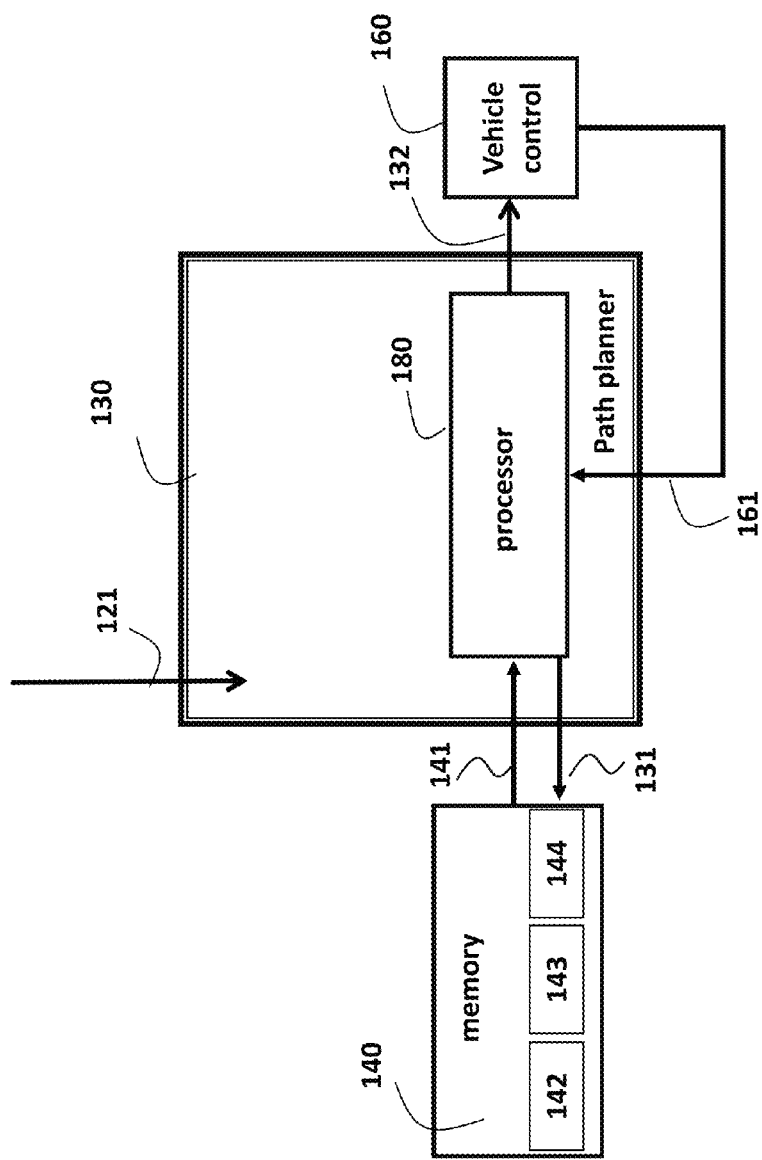
FIG. 1F is a general structure of the path-planning system according to one embodiment.

FIG. 1F shows a general structure of the path-planning system 130 and memory 140 according to one embodiment of the invention. The path-planning system 130 includes at least one processor 180 for executing modules of the path-planning system 130. The processor 180 is connected 131, 141 to a memory 140 that stores the neural networks 142. The memory 140 also stores 143 a logic that chooses the neural network 142 that is trained to the preferred driving style. The memory 140 also stores 144 the sensor data 121 for a given period of time, which the processor 180 uses to construct the time-series signal.

In various embodiments of the invention, it is realized that to learn the path from sensor data, is much more efficient than to learn control command from sensor data, for numerous reasons. For example, by training one or several neural networks to learn the future trajectory from data, the present invention provides a smooth ride to passengers in the car, better fuel efficiency, and less abrupt motions.

Figure 2A:
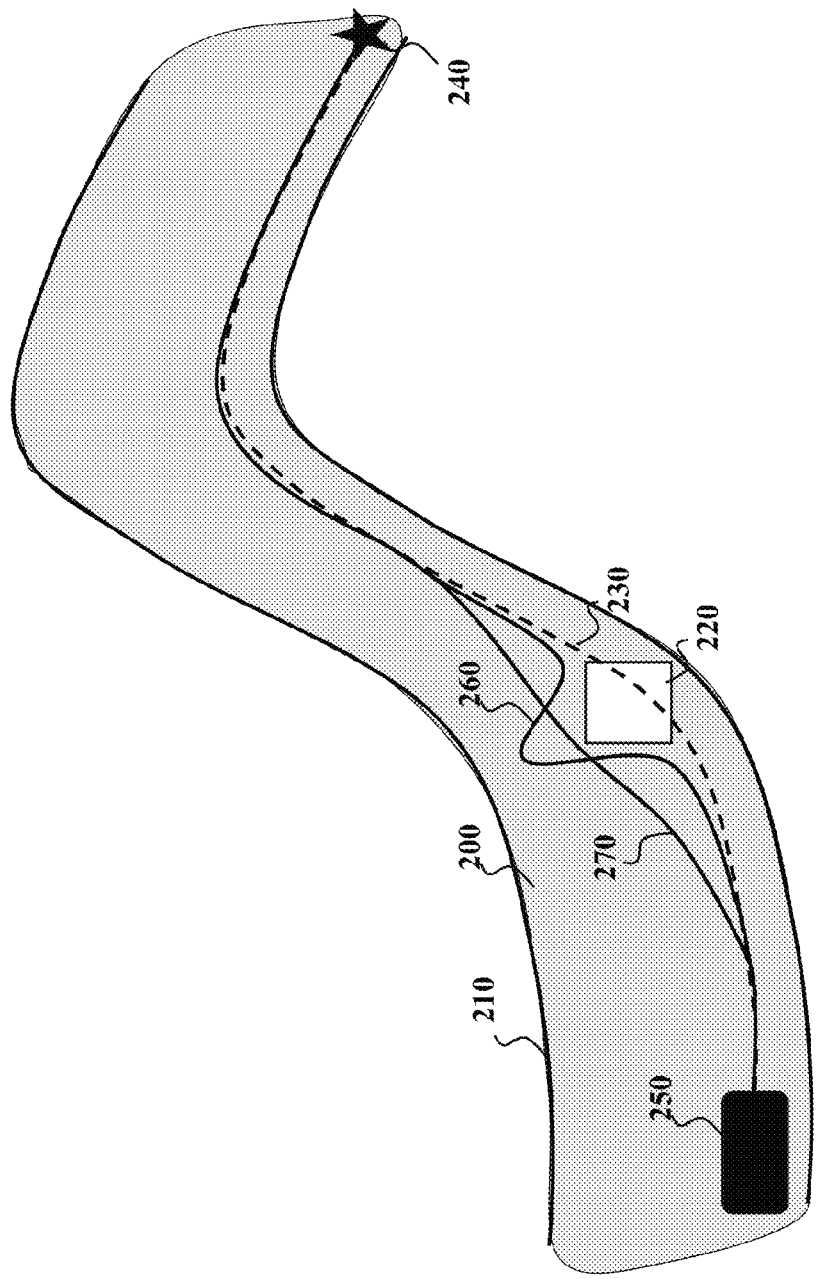
FIG. 2A is a schematic of a vehicle driving on a road with road boundaries.

FIG. 2A shows a schematic of a vehicle 250 driving on a road 200 with road boundaries 210. The road includes an obstacle 220. The objective of the vehicle is to reach 240 while staying on the road and avoiding the obstacle 220, preferably while staying close to some predefined path 230. From sensor data, at least one neural network has been trained offline to map a time-series signal to a trajectory 270. If instead a mapping from sensor data to control command is undertaken, there is no prediction involved. Therefore, robustness to model errors and sensor errors is violated, as a reader skilled in the art will appreciate. The obstacle 220 will still be avoided, but with much less smoothness.

Another example of efficiency is that using a neural network for mapping time-series signal to reference trajectory rather than control command, allows to apply the trained neural network to different vehicles. If a mapping to control command is undertaken, the particular mapping, and also the training, is dependent on the particular vehicle employed, since different vehicles have different systems, parameters, such as transmission ratios, steering gear ratios, et cetera, that takes a vehicle to a given position. Instead, if a mapping from a time-series signal to a referenced trajectory is used, no specific vehicle dynamics being implied in the mapping, and so both the system and method are vehicle independent.

Figure 2B:
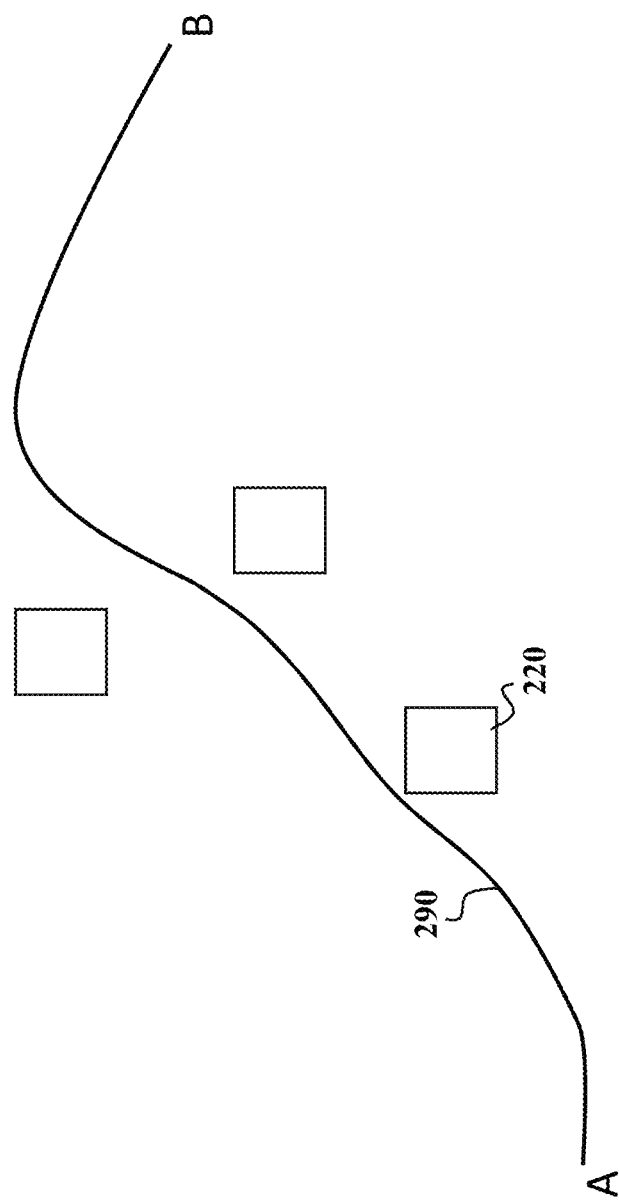
FIG. 2B is a schematic illustrating an intuition behind some embodiments.

FIG. 2B shows a schematic illustrating an intuition behind some embodiments that has relation to how humans learn and behave. For example, consider the case where a human intends to walk from point A to point B, as depicted in FIG. 2B, where obstacles 220 are present. A human senses the environment for a period of time, decides how to walk 290 to the goal B, and then executes the plan. Although the path for each human might be different, the reason for the difference is that the preference and decision making of each human is slightly different, rather than the muscle strength or dimension of limbs of each human, so how the execution of the plan is done is of less importance. Then, relating back to FIG. 1D, sensing of the environment corresponds to sensing by the sensors 120, the decision how to walk corresponds to path planning 130, and execution of the plan corresponds to controllers 150.

Figure 3:
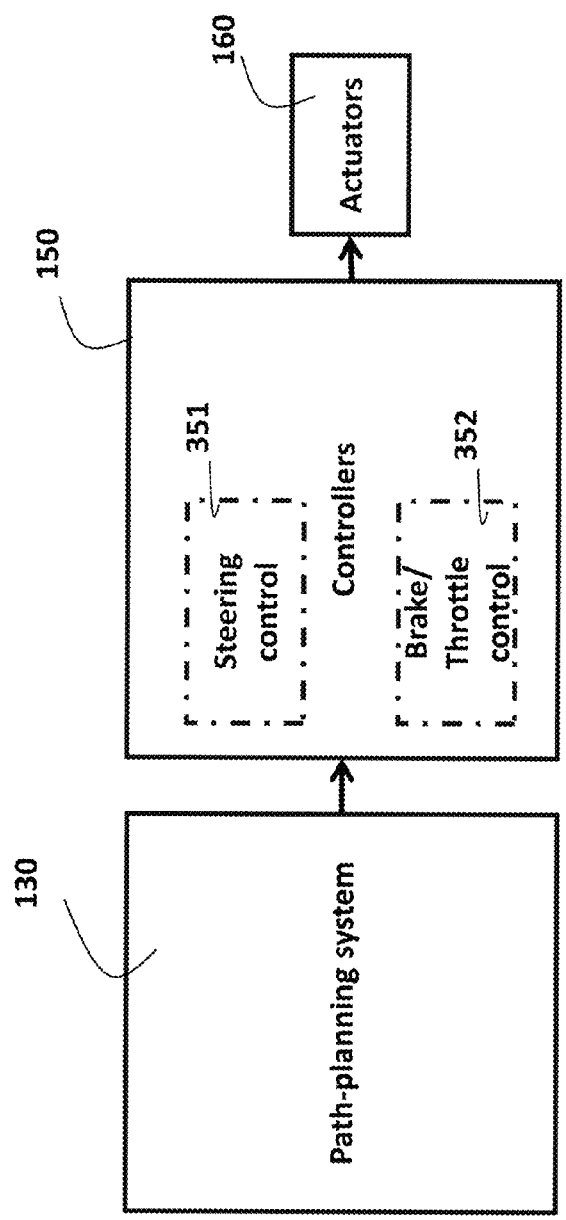
FIG. 3 is a schematic of interactions between the path-planning system and the vehicle controllers according to some embodiments.

FIG. 3 shows a schematic of interaction between the path-planning system and the vehicle controllers according to some embodiments. For example, in some embodiments of the invention, the controllers 150 of the vehicle are steering 351 and brake/throttle controllers 352 that control different entities associated with the motion of the vehicle. For example, the steering control 351 can map a reference trajectory from the path-planning system 330 to a motion trajectory of a vehicle, which includes a sequence of angles of the steering wheel of the vehicle. For example, the brake control module 352 can map a reference trajectory of the velocity to a brake pressure and engine throttle command trajectory of the vehicle.

Figure 4A:
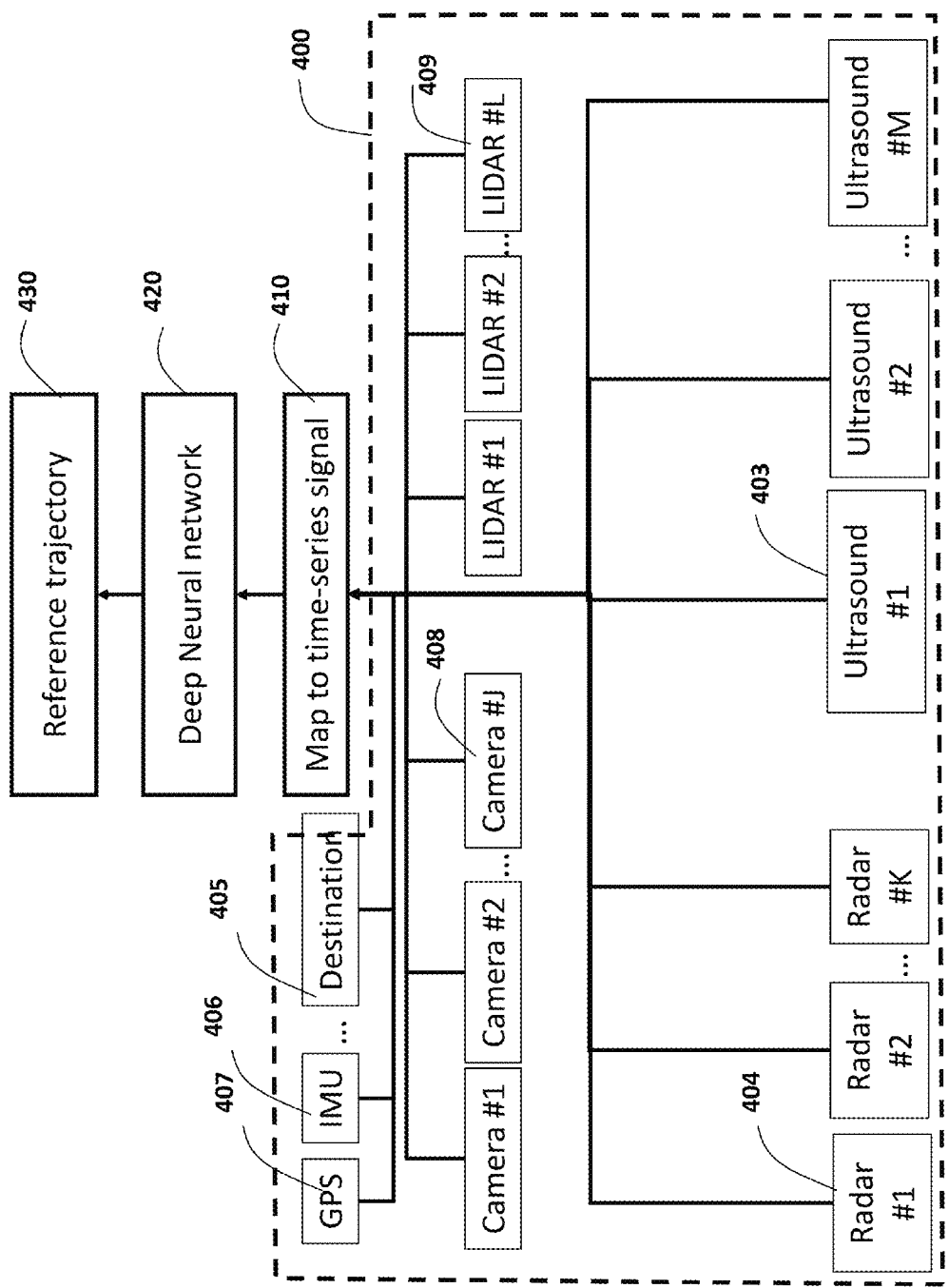
FIG. 4A is an exemplar schematic of the possible sensor configuration and mapping from sensor to reference trajectory employed by some embodiments.

FIG. 4A shows an exemplar schematic of the possible sensor configuration and mapping from sensor to reference trajectory, employed by some embodiments. In the exemplar schematic, the sensor configuration 400 consists of the following: a global positioning system (GPS) 407; an inertial measurement unit (IMU) 406; a waypoint, or set of waypoints (Destination) 405; J cameras 408, K radars 404, L LIDAR 409, and M ultrasound sensors 403. The sensor measurements are mapped 410 to a time-series signal. The time-series signal can be represented in many ways.

Figure 4B:
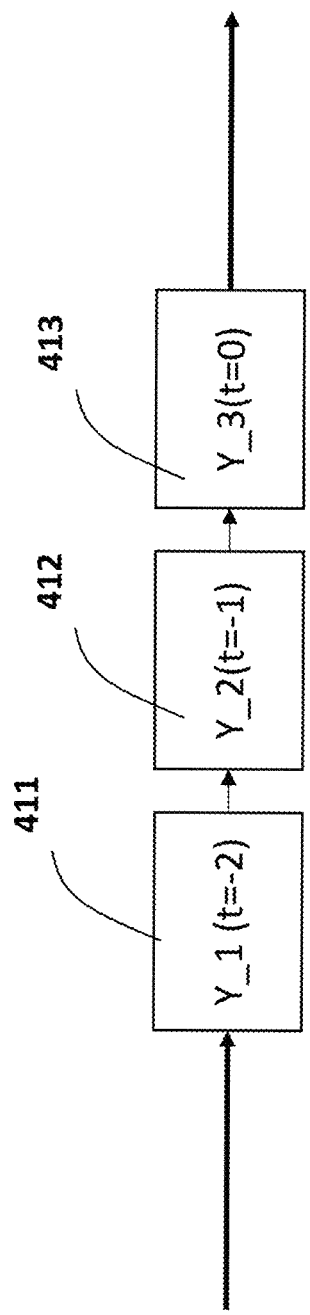
FIG. 4B is an example of time-series signal constructed from measurements of a list of sensors of the vehicle according to some embodiments.

FIG. 4B shows an example of time-series signal constructed from measurements of a list of sensors of the vehicle according to some embodiments. In this example, one item in the list of sensors corresponds to measurements of all sensors at a given time step, forming an input vector of fixed predetermined size. For instance, consider a scenario when three time instants of sensor data are to be used. The box 411 corresponds to the sensor data at time t=−2, box 412 corresponds to sensor data at time=t_1, and box 413 corresponds to sensor data at time t=0 (the current time), and so forth. Several neural networks can be trained. The set of waypoints, that is, the intermediate desired destinations of the vehicle, are given from, for example, a car-navigation system, and can be used to train the neural network to handle different scenarios.

According to some embodiments, different neural network can be trained for different driving styles. For example, one neural network can be trained for aggressive driving, another neural network can be trained for normal driving, and yet another one can be trained for cautious driving. For example, different collected data can be labeled as different driving style when training the respective network and the specific network is then targeted to different driving styles.

Figure 4C:
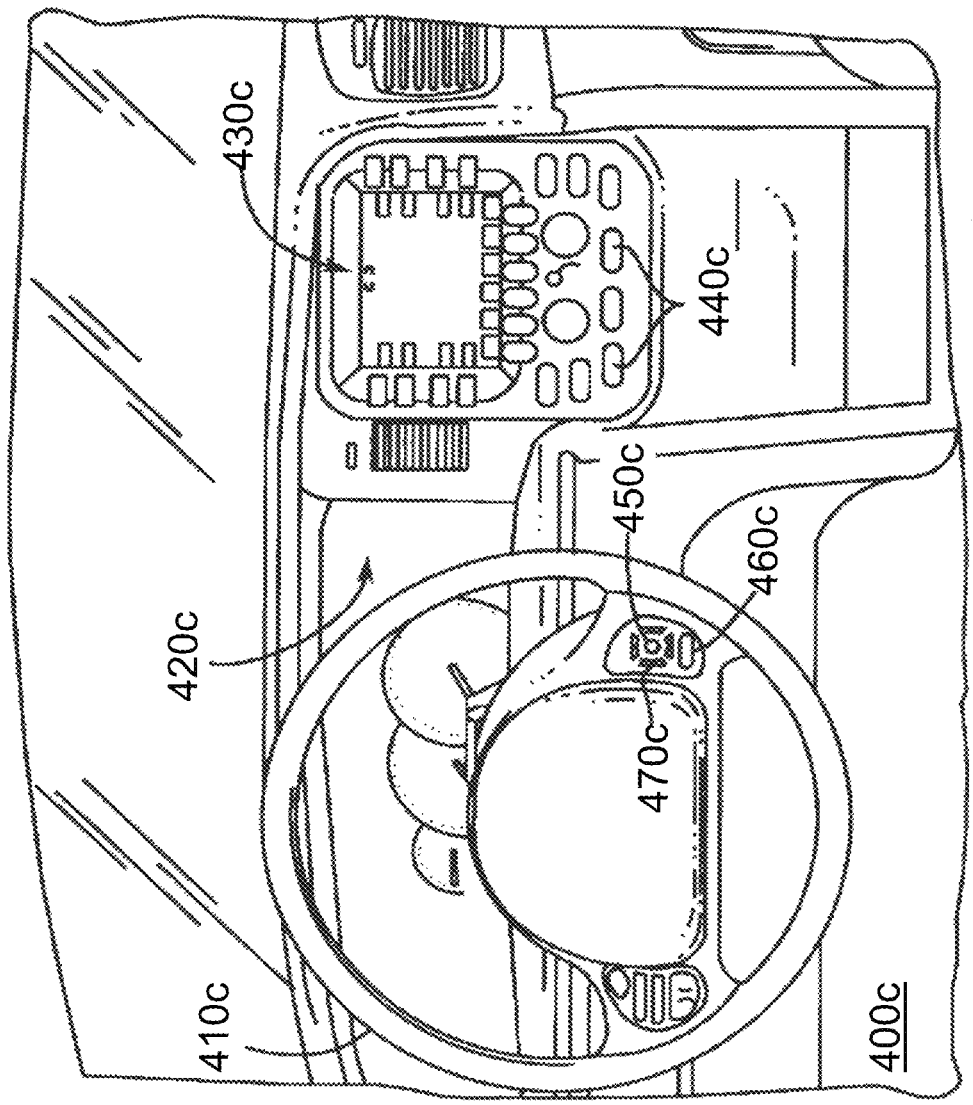
FIG. 4C is an exemplar setup of the relevant interiors of a semi-autonomous vehicle according to some embodiments.

FIG. 4C shows an exemplar setup of the relevant interiors, or a user interface, of a semi-autonomous vehicle, that is, a vehicle where the human operator of the vehicle can decide whether to drive in manual mode or in autonomous mode through a button 450c associated with the steering wheel or dashboard 440c of the vehicle. The dashboard 400c includes a steering wheel 410c with which the human operator can drive the vehicle and a display 420c for showing different modes, such as velocity and sensor outputs, of the vehicle. When in manual mode, by turning on learning mode 460c, the driving style of the human operator is learned and subsequently identified with a neural network that resembles the driving style of the human operator. The human operator, or another user of the vehicle, can also choose to input the operating mode manually 440c. Also included is a visualization module 430c that shows the planned path and surroundings of the vehicle and a button 470c for adding new driving styles, or refinements of the already included driving styles of the vehicle, over the air as they become available. Also included in 440c is a car-navigation system, or an equivalent system, which the human operator can use to insert a final destination of the vehicle, and the car-navigation system then provides waypoints, or intermediate target positions to the vehicle.

Figure 4D:
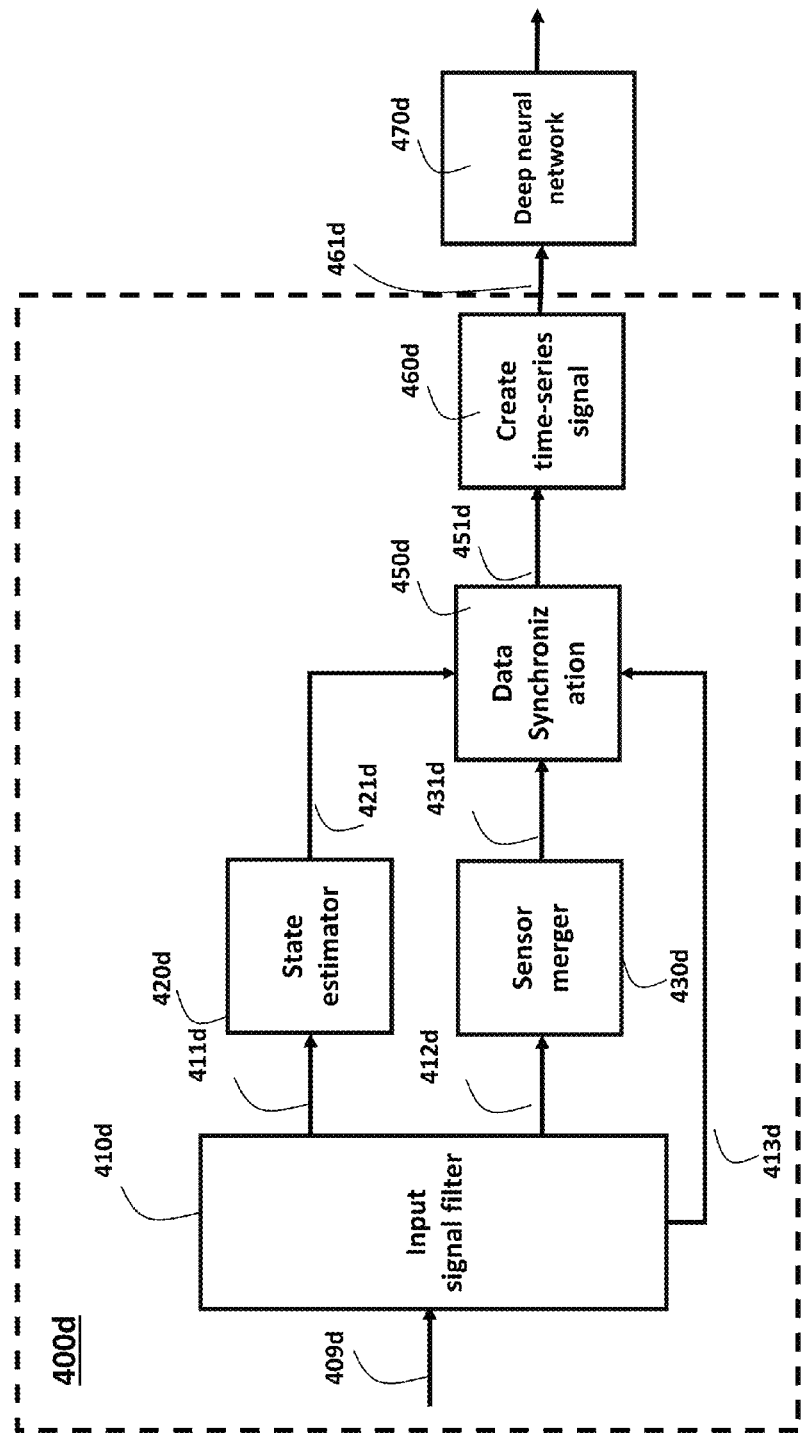
FIG. 4D is an exemplar block diagram of a method to filter and organize the sensor data into a time-series signal according to some embodiments.

FIG. 4D shows an exemplar block diagram 400d of a method to filter and organize the sensor data 409d into a time-series signal according to some embodiments. For example, input signal filter 410*d* can preprocess and determine new signals by processing IMU, which provides a derivation of the velocity of the vehicle, and GPS information 411*d*, which provides a position of the vehicle, into a state estimator 420*d*, to provide more accurate position and velocity information 421*d*, than possible if using the signals individually. The filter 410*d* can also determine a new signal 431*d* by processing the different sensor data 412*d*, such as LID and camera data, which give information indicative of the spatial constraints on the motion of the vehicle, by merging the different sensors 430*d*, providing a new sensor signal 431*d*. The input signal filter 410*d* can also be used to refine the set of waypoints, or target positions, given from, for example, a car-navigation system. This set of waypoints can also be merged with the other sensor data 412*d*. The block 450*d* synchronizes the refined state data 421*d* with the merged data 431*d*, so that they are ensured to correspond to the same time instants. Alternatively, the block 450*d* can synchronize the refined state data 421*d* with the unmerged data 413*d*, but with a refined set of waypoints. Finally, the synchronized sensor data 451*d* is used to create 460*d* a time-series signal, which is sent 461*d* to the neural network 470*d*.

FIG. 5 illustrates an exemplar list of possible specifications on the motion of a vehicle driving on roads, which are taken into consideration when training the neural network. The reference trajectory implicitly defines a number of specifications of the motion of the vehicle, which should ideally be fulfilled when controlling the motion of the vehicle. The specifications on the motion can be mapped to the constraints on the motion of the vehicle. For example, the specifications on the motion the vehicle can mandate the vehicle to stay on the road 500. Possible additional specifications are can mandate that the vehicle should drive in the middle of the lane 510 with a nominal velocity 520. A nominal velocity can be given by road speed limits or it can be given by a driver or passenger of the vehicle. For example, the specifications can also mandate the vehicle to maintain safety margin to surrounding obstacles. In addition, another possible specification is to maintain safety distance to vehicles in the same lane 540, which can be, but in general are not, the same as 530. For reasons of passenger comfort, fuel consumption, wear-and-tear, or other reasons, the specification can mandate a smooth drive 550 of the vehicle. Depending on the desired driving style of the specific network to be trained, different specifications can have different relative importance to the other.

Figure 6:
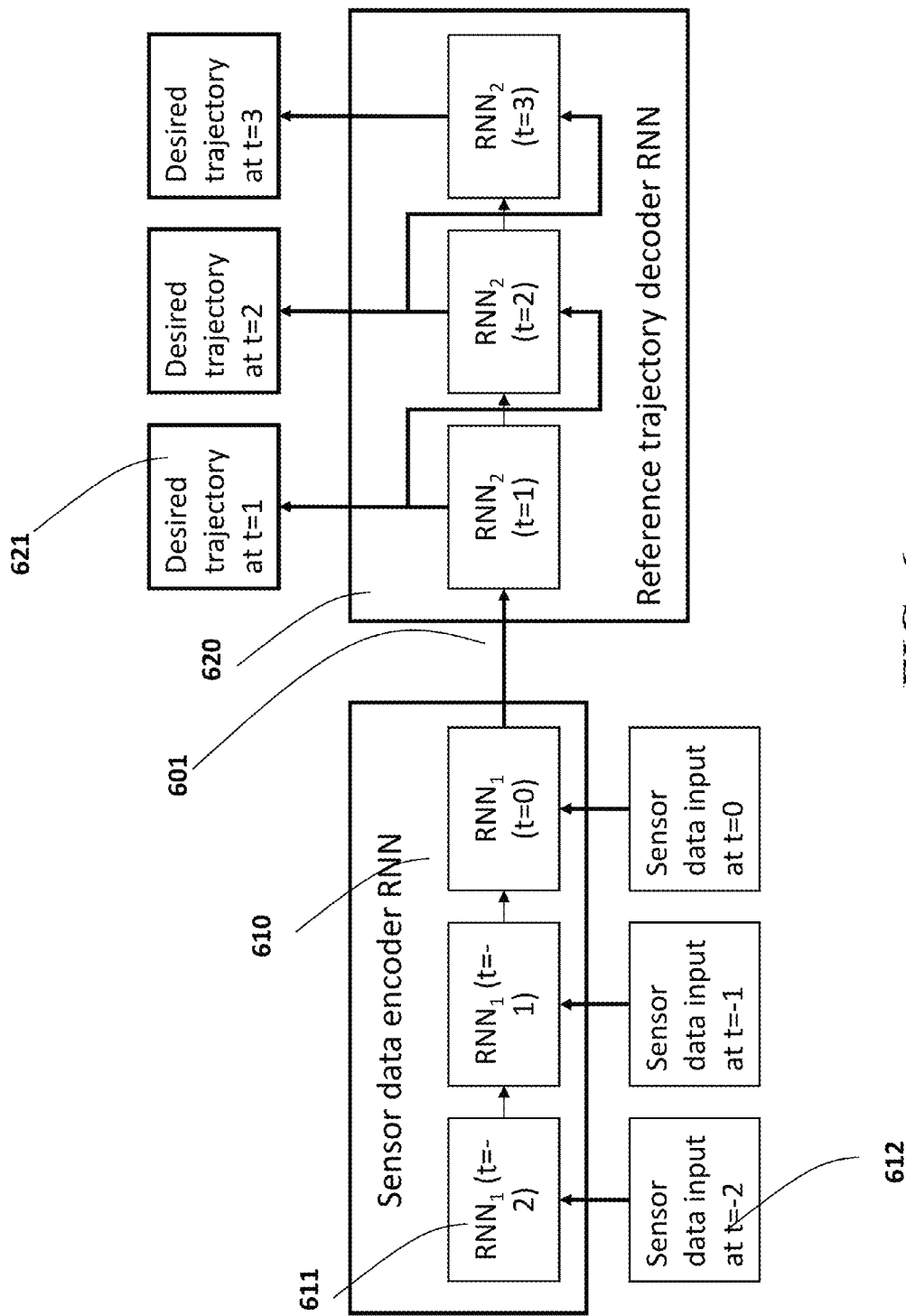
FIG. 6 is a block diagram of a deep neural network used by some embodiments.

FIG. 6 shows a block diagram of a deep neural network used by some embodiments. For example, in one embodiment, the deep neural network includes two parts. The first part is an encoder subnetwork 610, which encodes the time-series signal 611 in a representation 601 indicative of the constraints on the motion of the vehicle, which enables efficient path planning. The second part includes a decoder subnetwork 620, which is trained to produce the reference trajectory 621 from the information 601 indicative of the constraints on the motion of the vehicle. Both the encoder and decoder networks are realized as recurrent neural networks 611. It is to be understood that any given number of recurrent neural networks can be employed for the intended purpose. The goal of the encoder network 610 is to extract information necessary for generating a reference trajectory. For example, when a human drives on a highway with obstacles in the vicinity of the vehicle, information about birds in trees or obstacles several hundred meters ahead, is of less importance.

At each time instance, the sensor measurements 612, for example, as described in relation with FIG. 4D, or images from a camera or three-dimensional point coordinates from a LIDAR, or one of the two combined with GPS information and destinations, captured by the sensing devices equipped in the machine and given by the car-navigation system, together with position information are inputted to the encoder network. The encoder network processes the data through layers of neural computations, which consists of inner product and rectified linear unit nonlinearity operations. The output of the encoder network at each time instance is an abstract representation of the surroundings that can be used by the decoder network to generate a reference trajectory.

At each time instance, the decoder network 620 takes the representation 601 computed by the encoder network 610 as the input and outputs a reference trajectory. The trajectory can be defined in several ways, e.g., as a sequence 621 of point coordinate, or as a sequence of point coordinates with velocity information, or other combinations. The decoder network 620 generates the point coordinates 621 one by one. Note that the decoder network 620 is non-casual and can generate future trajectories.

In some embodiments, both the encoder and decoder networks are recurrent neural networks for allowing dynamic temporal behavior of the resulting network. Various versions of recurrent neural networks, such as the long-term-short-term memory recurrent neural network, or the stacked recurrent neural network, can be utilized. A recurrent neural network can have several layers. Each layer can be a fully connected or convolutional.

Figure 7:
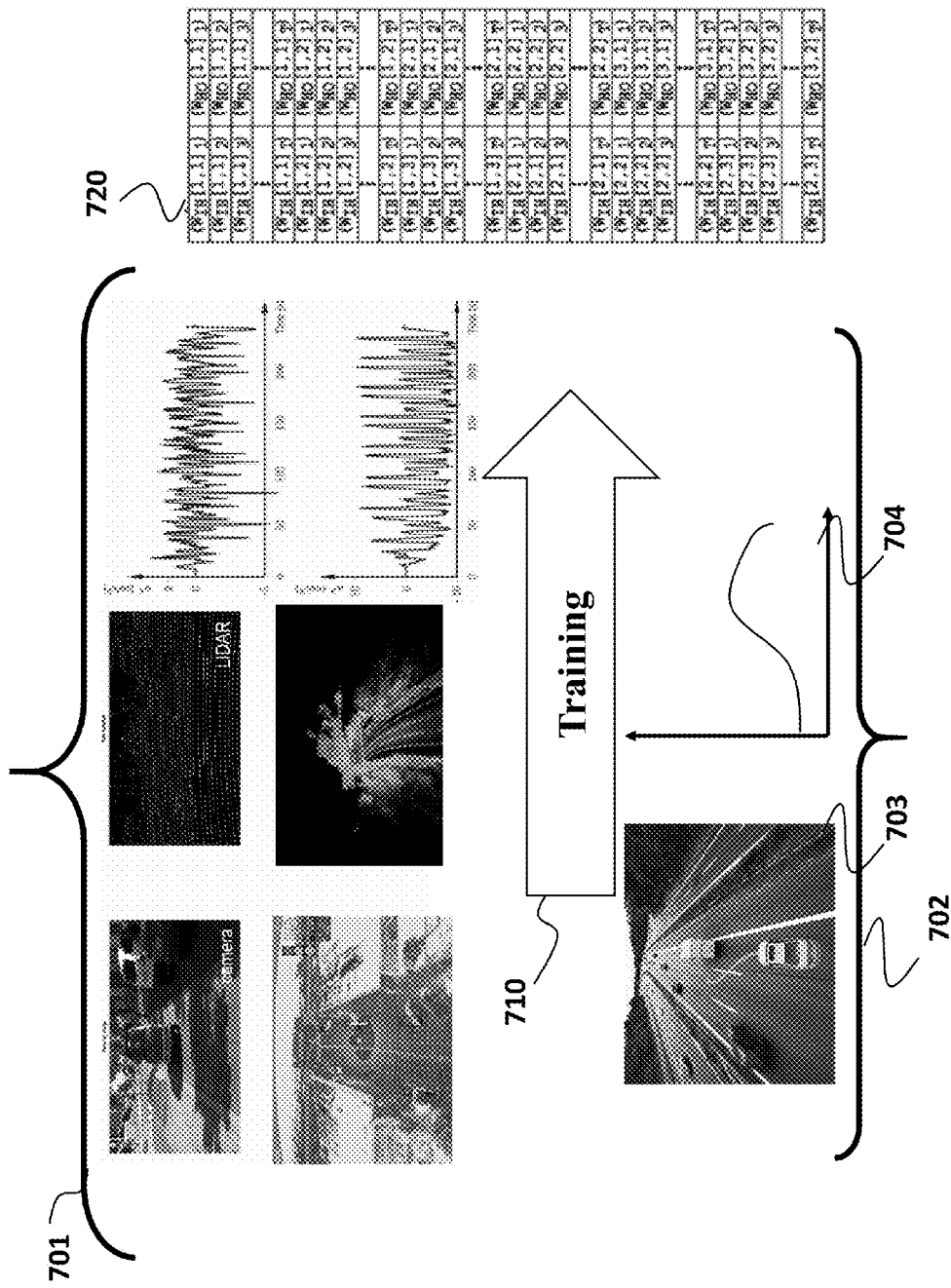
FIG. 7 is a schematic of training the neural network according to some embodiments.

FIG. 7 shows a schematic of training the neural network according to some embodiments. The training 710 uses a training set of sequences of sensor inputs 701 and corresponding desired trajectories 702 to produce the weights 720 of the RNNs. In general, training an artificial-neural-network comprises applying a training algorithm, sometimes referred to as a "learning" algorithm. A training set may include one or more sets of inputs and one or more sets of outputs with each set of inputs corresponding to a set of outputs. A set of outputs in a training set comprises a set of outputs that are desired for the neural network to generate when the corresponding set of inputs is inputted to the neural network.

For example, one embodiment trains the neural network, such as the network 080, in an end-to-end fashion. The training 710 involves mapping a sequence of sensor data 701 to a future trajectory 702, such as path 703 and velocity 704 of the vehicle using rewards, where the rewards of the deep neural network have been defined in advance. The rewards can, for example, can be selected based on a desired driving style and/or with respect to specification on the motion of the vehicle. Example of such a specification is described with reference to FIG. 5.

The training data can include input time-series signals from the onboard sensors and the desired output vehicle trajectories, for example, but not necessarily, given as a sequence of Cartesian coordinates relative to the vehicle. In addition, the training data can include desired velocity profiles, for example given by a passenger of the vehicle, and the input data can be labeled according to the current driving style that is being trained. Several neural networks can be trained according to the number of preferred driving styles, and the corresponding labeled data tailors a neural network to every driving style.

For example, the operator or another user of the vehicle can choose the driving style to be used, or the operator can choose to let the vehicle decide the driving style that is suitable for the current user of the vehicle, which is then selected from the memory of the vehicle. The output trajectories can include velocity information or can be described without accompanying time information. The time-series signals are sent to the encoder network for computing the information indicative of the constraints on the motion of the vehicle. The information is then passed to the decoder network for generating an output trajectory matching the desired one. The mismatching between the generated trajectory and the desired trajectory provides a supervised signal for updating the neural network weights. The training can be achieved via an off-the-shelf feedforward neural network training algorithm such as the stochastic gradient descent with momentum algorithm. The decoder and encoder networks are trained together, because there is no output target for the encoder network and there is no input signal for the decoder network if the two networks are trained separately. Furthermore, the structure of the recurrent neural network ensures that the future trajectory can be learned by observing the past trajectory.

Training of the networks can also be done using simulated data that mimics different driving styles. With such an approach, although not perfectly matching real drivers, the training phase and the amount of data collection can be significantly decreased.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Additionally, or alternatively, the above-described embodiments can be implemented as a non-transitory computer readable storage medium embodied thereon a program executable by a processor for performing a method of various embodiments.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling a vehicle, comprising:
generating, using at least one sensor, a time-series signal indicative of a variation of the environment in vicinity of the vehicle with respect to a motion of the vehicle;
selecting from a memory a neural network trained to transform time-series signals to reference trajectories of the vehicle;
submitting the time-series signal to the neural network to produce a reference trajectory as a function of time that satisfies time and spatial constraints on a position of the vehicle;
determining a motion trajectory tracking the reference trajectory while satisfying constraints on the motion of the vehicle; and
controlling the motion of the vehicle to follow the motion trajectory, wherein at least some steps of the method are performed by a processor operatively connected to the memory and the sensor.

2. The method of claim 1, wherein the time-series signal includes a derivative of measurements of the sensor.

3. The method of claim 2, wherein the neural network is trained to receive as an input a vector of a predetermined size, the input vector including elements representing a combination of the time-series signal, first information indicative of a current position of the vehicle, second information indicative of a target position of the vehicle, and third information indicative of the spatial constraints on the current position of the vehicle, further comprising:
determining the current position of the vehicle;
retrieving from the memory the target position of the vehicle and information indicative of the spatial constraints on the current position of the vehicle;
filtering the measurements of the sensor to produce the time-series signal, such that the combination of the time-series signal with the first information, the second information, and the third information results in the vector of the predetermined size;
combining of the time-series signal with the first information, the second information, and the third information to produce an input vector of the predetermined size; and
inputting the input vector into the neural network to produce the reference trajectory.

4. The method of claim 3, wherein the filtering comprises:
merging and synchronizing measurements of different sensors of the vehicle.

5. The method of claim 1, wherein the memory stores a set of neural networks, each neural network in the set is trained to consider a different driving style for mapping the time-series signals to reference trajectories of the vehicle, further comprising:
determining a driving style for controlling the vehicle; and
selecting from the memory the neural network corresponding to the determined driving style.

6. The method of claim 5, wherein the driving style is determined based on an input from a user of the vehicle.

7. The method of claim 5, wherein the vehicle is a semi-autonomous vehicle, further comprising
learning the driving style of a driver of the vehicle while the vehicle is driven in a manual mode.

8. The method of claim 1, wherein the neural network includes an encoding subnetwork and a decoding subnetwork trained concurrently with the encoding subnetwork, wherein the encoding subnetwork is trained to transform the time-series signal to information indicative of the constraints on the motion of the vehicle, and wherein the decoding subnetwork is trained to produce the reference trajectory from the information indicative of the constraints on the motion of the vehicle.

9. The method of claim 8, wherein the encoding and decoding subnetworks are recurrent neural networks.

10. The method of claim 8, wherein the encoding and decoding subnetworks are trained using simulation data for different driving patterns.

11. The method of claim 1, wherein the reference trajectory defines an objective for the motion of the vehicle, and wherein the motion trajectory includes a set of commands for the actuators of the vehicle to move the vehicle according the objective.

12. A system for controlling a vehicle, comprising:

at least one sensor for sensing the environment in vicinity of the vehicle to generate a time-series signal indicative of a variation of the environment with respect to a motion of the vehicle;

a memory storing a neural network trained to transform time-series signals to reference trajectories of the vehicle;

at least one processor configured for submitting the time-series signal to the neural network selected from the memory to produce a reference trajectory as a function of time that satisfies time and spatial constraints on a position of the vehicle and for determining a motion trajectory tracking the reference trajectory while satisfying constraints on the motion of the vehicle; and a controller for controlling the motion of the vehicle to follow the motion trajectory.

13. The system of claim 12, wherein the memory stores a set of neural networks, each neural network in the set is trained to consider a different driving style for mapping the time-series signals to reference trajectories of the vehicle, wherein the processor selects from the memory the neural network corresponding to a determined driving, further comprising:

an input interface for accepting a selection of the driving style from a user of the vehicle.

14. The system of claim 12, wherein the neural network includes an encoding subnetwork and a decoding subnetwork trained concurrently with the encoding subnetwork, wherein the encoding subnetwork is trained to transform the time-series signal to information indicative of the constraints on the motion of the vehicle, and wherein the decoding subnetwork is trained to produce the reference trajectory from the information indicative of the constraints on the motion of the vehicle.

15. The system of claim 14, wherein the encoding and decoding subnetworks are recurrent neural networks.

16. The system of claim 14, wherein the encoding and decoding subnetworks are trained using simulation data for different driving patterns.

17. The system of claim 12, wherein the reference trajectory defines an objective for the motion of the vehicle, and wherein the motion trajectory includes a set of commands for actuators of the vehicle to move the vehicle according the objective.

18. A non-transitory computer readable storage medium embodied thereon a program executable by a processor for performing a method, the method comprising:

generating a time-series signal indicative of a variation of the environment in vicinity of the vehicle with respect to a motion of the vehicle;

selecting a neural network trained to transform time-series signals to reference trajectories of the vehicle;

submitting the time-series signal to the neural network to produce a reference trajectory as a function of time that satisfies time and spatial constraints on a position of the vehicle;

determining a motion trajectory tracking the reference trajectory while satisfying constraints on the motion of the vehicle; and controlling the motion of the vehicle to follow the motion trajectory.

* * * * *